(12) United States Patent
Lai

(10) Patent No.: US 8,727,595 B2
(45) Date of Patent: May 20, 2014

(54) BACKLIGHT STRUCTURE WITH REFLECTIVE LIGHT SOURCE COVER AND MANUFACTURING METHOD

(75) Inventor: Ching-Kun Lai, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 309 days.

(21) Appl. No.: 13/224,447

(22) Filed: Sep. 2, 2011

(65) Prior Publication Data
US 2012/0063163 A1 Mar. 15, 2012

(30) Foreign Application Priority Data

Sep. 9, 2010 (TW) ................................ 99130507 A
Jun. 21, 2011 (TW) ............................. 100121649 A

(51) Int. Cl.
*F21V 7/04* (2006.01)

(52) U.S. Cl.
USPC ...................... 362/609; 362/23.09; 362/23.14; 362/608

(58) Field of Classification Search
USPC ............ 362/23.09, 23.1, 23.14, 23.16, 23.17, 362/612, 613, 608, 609; 349/62, 65
See application file for complete search history.

(56) References Cited

U.S. PATENT DOCUMENTS

| 4,903,172 | A * | 2/1990 | Schoniger et al. | 362/612 |
| 6,969,188 | B2 * | 11/2005 | Kuo | 362/613 |
| 7,033,062 | B2 * | 4/2006 | Lee et al. | 362/609 |
| 7,073,933 | B2 * | 7/2006 | Gotoh et al. | 362/624 |
| 7,220,039 | B2 * | 5/2007 | Ahn et al. | 362/612 |
| 7,220,040 | B2 * | 5/2007 | Lengyel et al. | 362/612 |
| 7,441,938 | B2 * | 10/2008 | Sakai et al. | 362/634 |
| 7,510,316 | B2 * | 3/2009 | De Vaan | 362/622 |
| 7,800,711 | B2 * | 9/2010 | Kim | 349/65 |
| 7,898,613 | B2 | 3/2011 | Jung et al. | |
| 8,167,476 | B2 * | 5/2012 | Sakamoto et al. | 362/612 |

(Continued)

FOREIGN PATENT DOCUMENTS

| CN | 1967350 A | 5/2007 |
| CN | 101307894 A | 11/2008 |

(Continued)

OTHER PUBLICATIONS

English translation of abstract and pertinent parts of CN 101307894 A.

(Continued)

*Primary Examiner* — Ismael Negron
(74) *Attorney, Agent, or Firm* — McClure, Qualey & Rodack, LLP

(57) ABSTRACT

A backlight structure includes a light guide plate, at least one light source module, and a reflective cover. The light guide plate has a light incident side and a light-exiting surface, wherein the light-exiting surface is formed at an edge of the light incident side. The light source module includes a substrate and at least one light emitting element, wherein the light emitting element disposed on the substrate emits light to the light incident side. The reflective cover has a first reflecting portion and a second reflecting portion, wherein the second reflecting portion extends from the first reflecting portion disposed between a surface of the substrate and the light incident side of the light guide plate and covers a part of the light-exiting surface, so that the reflective cover reflects light emitted from the light emitting element to the light guide plate.

24 Claims, 6 Drawing Sheets

(56) References Cited

U.S. PATENT DOCUMENTS

| | | | |
|---|---|---|---|
| 2008/0151141 A1* | 6/2008 | Huang et al. | 349/65 |
| 2008/0232135 A1 | 9/2008 | Kinder et al. | |
| 2010/0214804 A1 | 8/2010 | Shigeta et al. | |

FOREIGN PATENT DOCUMENTS

| | | |
|---|---|---|
| CN | 101809361 A | 8/2010 |
| CN | 101936509 A | 1/2011 |
| CN | 101975371 A | 2/2011 |
| JP | 2005-108512 | 4/2005 |
| KR | 10-2006-0089020 | 8/2006 |
| KR | 10-2006-0105112 | 10/2006 |
| TW | I283774 | 7/2007 |
| TW | 201020633 | 6/2010 |
| TW | 201044071 | 12/2010 |
| TW | 201115192 | 5/2011 |

OTHER PUBLICATIONS

English translation of abstract of CN 101809361 A.
English translation of abstract and pertinent parts of CN 1967350 A (published May 23, 2007).
China Office Action issued Feb. 5, 2013.
English translation of abstract of TW I283774.
English translation of abstract of JP 2005-108512.
English translation of abstract of KR 10-2006-0089020.
English translation of abstract of KR 10-2006-0105112.
English translation of abstract of TW 201115192.
English translation of abstract of TW 201044071.
English translation of abstract of TW 201020633.
English translation of abstract and pertinent parts of CN 101307894 A, Nov. 11, 2011.
English translation of abstract of CN 101809361 A, Nov. 11, 2011.
China Office Action dated Aug. 25, 2011.
China Office Action dated Sep. 23, 2013.
English translation of claim 1 of CN 101936509 A (published Jan. 5, 2011).
English translation of paragraph [0087] of CN 101975371 A (published Feb. 16, 2011).

* cited by examiner

BACKLIGHT STRUCTURE WITH REFLECTIVE LIGHT SOURCE COVER AND MANUFACTURING METHOD

BACKGROUND OF THE INVENTION

1. Field of the Invention

The invention generally relates to a backlight structure and a manufacturing method thereof. More particularly, the present invention relates to a backlight structure having a reflective cover and a manufacturing method thereof to improve the leakage of light between the light incident side of the light guide plate and the light source module and the warpage of the optical film by intimately attaching the reflective cover and the optical film to the light guide plate and further enhance the light utilization efficiency.

2. Description of the Prior Art

Because the liquid crystal molecules of the liquid crystal display themselves cannot emit light, an additional light source is required to achieve the display function of the liquid crystal display. The conventional method is utilizing a backlight module disposed on the rear side of the liquid crystal display panel as a light source of the liquid crystal display. The backlight module is mainly composed by a light guide plate and at least one light emitting element, wherein light emitted from the light emitting elements is guided by the light guide plate to the liquid crystal display panel and serves as the light source for display, so that the display function of the liquid crystal display can be achieved. Conventional backlight modules generally include edge lighting type and bottom lighting type backlight modules, wherein the edge lighting type backlight module emits light to the side of the light guide plate, while the bottom lighting type backlight module emits light to the bottom of the light guide plate.

In general, besides becoming the light source for display, light emitted from the light emitting elements partially leaks out. Therefore, a reflector is disposed on the bottom of the light guide plate in the edge lighting type backlight module or on the bottom surface of the casing of the bottom lighting type backlight module, so that light leaking from the bottom surface of the light guide plate can be reflected back to the light guide plate as the display light source. However, besides leaking from the bottom surface of the light guide plate, a part of light generated from the light emitting elements directly emits outward without entering the light guide plate.

SUMMARY OF THE INVENTION

One object of the present invention is to provide a backlight structure and a manufacturing method thereof to improve the leakage of light from the light incident side of the light guide plate and further enhance the light utilization efficiency.

The backlight structure of the present invention includes a light guide plate, a light source module, and a reflective cover. The light guide plate has a light incident side and a light-exiting surface, wherein the light-exiting surface is formed on an edge of the light incident side. The light source module includes a substrate and a light emitting element, wherein the light emitting element disposed on the substrate emits light to the light incident side. The reflective cover has a first reflecting portion and a second reflecting portion, wherein the first reflecting portion is disposed between a surface of the substrate and the light incident side of the light guide plate, the second reflecting portion extends from the first reflecting portion and covers a part of the light-exiting surface, so that the reflective cover reflects light emitted from the light emitting element to the light guide plate.

The method for manufacturing the backlight structure of the present invention includes: providing a light guide plate; disposing a light source module including a substrate and a light emitting element, so that the light emitting element disposed on the substrate emits light to the light incident side of the light guide plate; and disposing a reflective cover having a first reflecting portion and a second reflecting portion, wherein the second reflecting portion extends from the first reflecting portion disposed between the surface of the substrate and the light incident side of the light guide plate and covers a portion of the light-exiting surface formed on an edge of the light incident side, so that the light reflective cover reflects light emitted from the light emitting element to the light guide plate.

By means of the reflective cover, the present invention improves the leakage of light from the light incident side of the light guide plate and enhances the light utilization efficiency.

DETAILED DESCRIPTION OF THE PREFERRED EMBODIMENT

A backlight structure and a manufacturing method thereof are provided. In a preferred embodiment, the backlight structure of the present invention serves as a backlight module utilized in flat panel displays such as liquid crystal displays. In other embodiments, however, the backlight structure of the present invention can be utilized in other devices required of a backlight source.

Figure 1A:
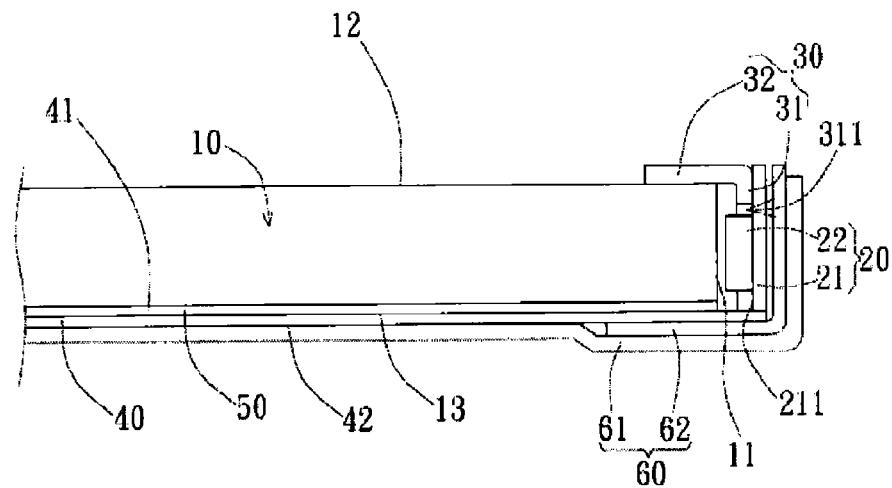
FIG. 1A is a schematic view of a first embodiment of the backlight structure of the present invention.
Figure 1B:
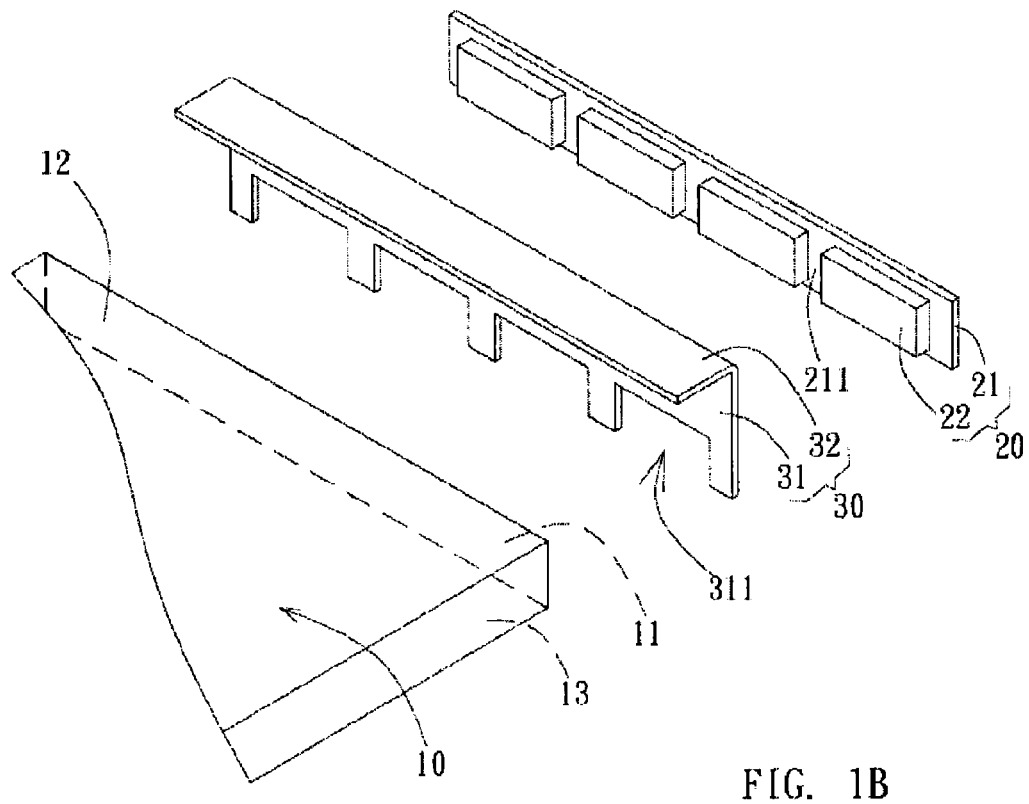
FIG. 1B is an exploded view of the backlight structure shown in FIG. 1A.

FIG. 1A is a schematic view of a first embodiment of the backlight structure of the present invention. FIG. 1B is an exploded view of the backlight structure shown in FIG. 1A. As shown in FIGS. 1A and 1B, the backlight structure includes a light guide plate 10, a light source module 20, a reflective cover 30, a reflector 40, and a supporting structure 60. The light guide plate 10 has a light incident side 11, a light-exiting surface 12, and a bottom surface 13. The light-exiting surface 12 is a surface of the light guide plate 10 that faces upward; the bottom surface 13 is another surface of the light guide plate 10 that faces downward. The light incident side 11 is disposed on the sidewall of the light guide plate 10, wherein the light-exiting surface 12 and the bottom surface 13 are formed on two opposite ends of the light incident side 11, so that the light-exiting surface 12 and the bottom surface 13 are angularly connected to the light incident side 11.

The light source module 20 includes a substrate 21 and at least one light emitting element 22. The light emitting element 22 is disposed on the substrate 21 and emits light to the light incident side 11. The light source module 20 is preferably a light bar consisting of light-emitting diodes that serve as the light emitting elements 22. In different embodiments, when optical microstructures are formed on the bottom surface 13, preferably, a portion of the bottom surface 13 corresponding to the light source element 22 is conserved without any optical microstructure formed thereon (shown in FIG. 3) to avoid the formation of hot spot, further enhancing the light utilization efficiency.

The reflective cover 30 has a first reflecting portion 31 and a second reflecting portion 32. In the embodiment, the material of the reflective cover 30 is metal material. In other embodiments, however, the material of the reflective cover 30 can be plastics or other materials having similar functions. The first reflecting portion 31 is disposed between a surface 211 of the substrate 21 of the light source module 20 and the light incident side 11 of the light guide plate 10. The second reflecting portion 32 extends from the first reflecting portion 31 toward the light guide plate 10, traverses the connecting border between the light incident side 11 and the light-exiting surface 12, so that the second reflecting portion 32 further traverses the light light-exiting surface 12 and covers a portion of the light-exiting surface 12 around its edge. As such, the whole reflective cover 30 can reflect light emitted from the light emitting element 22 to the light guide plate 10. In the embodiment, a cross-section of the first reflecting portion 31 and the second reflecting portion 32 forms a substantially L shape or L-like shape.

Figure 2:
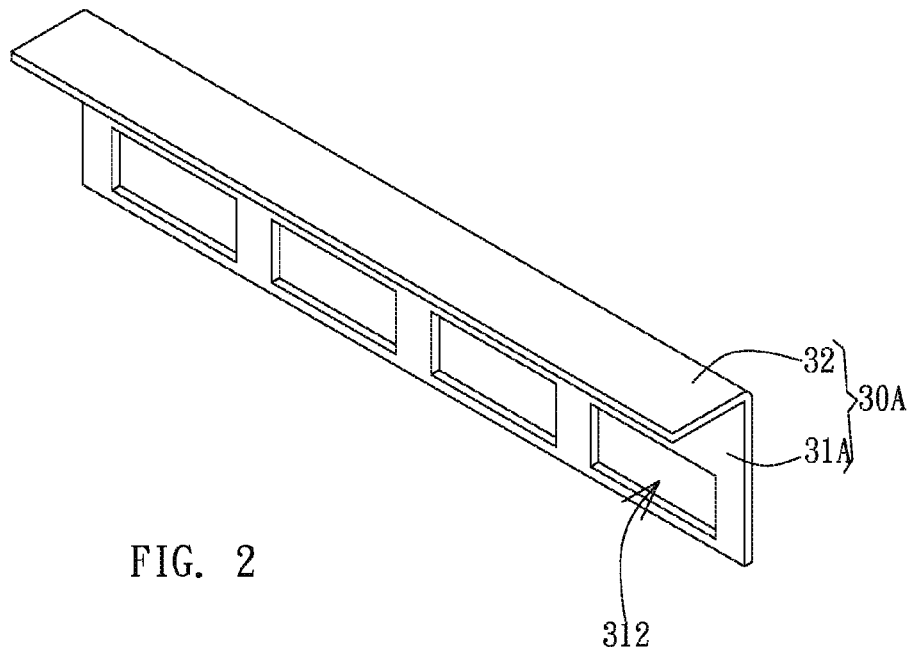
FIG. 2 is a schematic view of another embodiment of the reflective cover of the backlight structure of the present invention.

Besides, in the embodiment, the first reflecting portion 31 is attached onto the surface 211 of the light source module 20, and a recess 311 is recessed from a bottom side of the first reflecting portion 31 to allow the light emitting element 22 to pass therethrough. In other embodiments, however, a space may exist between the first reflecting portion 31A and the surface 211, as shown in FIG. 2, and a through hole 312, for example closed hole, is formed on the middle part of the first reflecting portion 31A to allow the light emitting element 22 to pass therethrough. By disposing the reflective cover 30A and utilizing the structure of the reflective cover 30A, the present invention improves the leakage of light between the light incident side 11 of the light guide plate 10 and the light source module 20 and enhances the light utilization efficiency.

The reflector 40 is attached onto the bottom surface 13 of the light guide plate 10 and reflects light emitted from the light emitting element 22 to light guide plate 10, so that light leaking from the bottom surface 13 of the light guide plate 10 is reflected back to the light guide plate 10, further enhancing the light utilization efficiency. In the embodiment, the reflector 40 is attached onto the light guide plate 10 by a glue layer 50, wherein the refractive index of the glue layer is preferably equal to about 1.0. In other embodiments, however, the reflector 40 can be directly attached onto the light guide plate 10.

The supporting structure 60 supports the light guide plate 10, the light source module 20, the reflective cover 30, and the reflector 40. The supporting structure 60 includes a back plate 61 and a heat sink 62. The reflector 40 has a first surface 41 and a second surface 42 opposite to the first surface 41. The first surface 41 is attached onto the bottom surface 13 of the light guide plate 10 by the glue layer 50, while the second surface 42 is attached onto the back plate 61 and the heat sink 62. In the preferred embodiment, the reflector 40 is attached onto the back plate 61 and the heat sink 62 by adhesive material, such as double sided tape. In other embodiments, however, the reflector 40 and the supporting structure 60 are optional and can be omitted. The supporting structure 60 can have different designs in material or structure.

Figure 3:
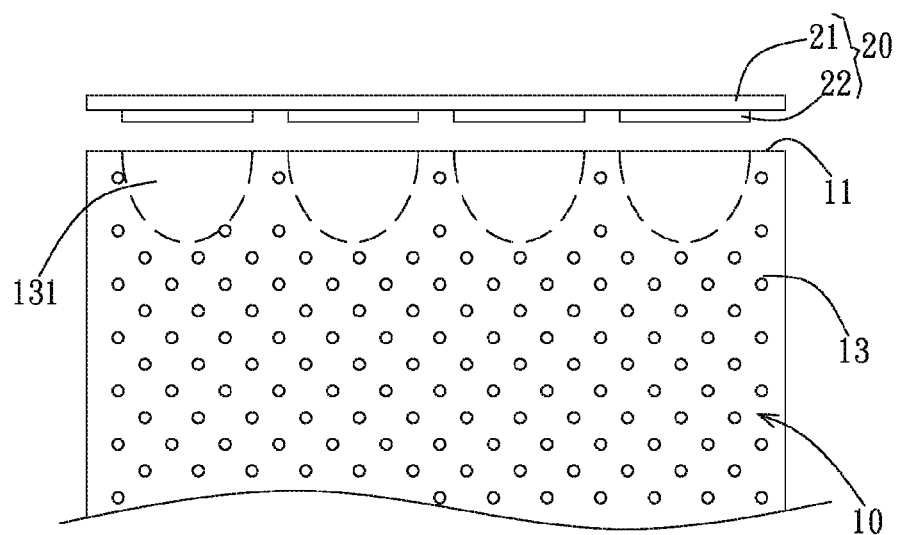
FIG. 3 is a schematic view of an embodiment of the bottom surface of the light guide plate of the backlight structure of the present invention.

FIG. 3 is a schematic view of an embodiment of the bottom surface of the light guide plate of the backlight structure of the present invention. As shown in FIG. 3, a portion of the bottom surface 13 of the light guide plate 10 near the light emitting element 22 is an unpatterned region 131, and optical microstructures are formed on the bottom surface 13 outside the unpatterned region 131. As described above, the unpatterned region 131 is provided to avoid the formation of hot spot and further enhance the light utilization efficiency. The unpatterned region 131 and the portion of the bottom surface 13 having the optical microstructures are preferably formed by a printing method. In other embodiments, however, the disposition of the optical microstructures can be modified according to design requirements. For example, the entire bottom surface 13 can be provided with or without the optical microstructures. Besides, the unpatterned region 131 or the optical microstructures can be formed by other methods if required.

Figure 4:
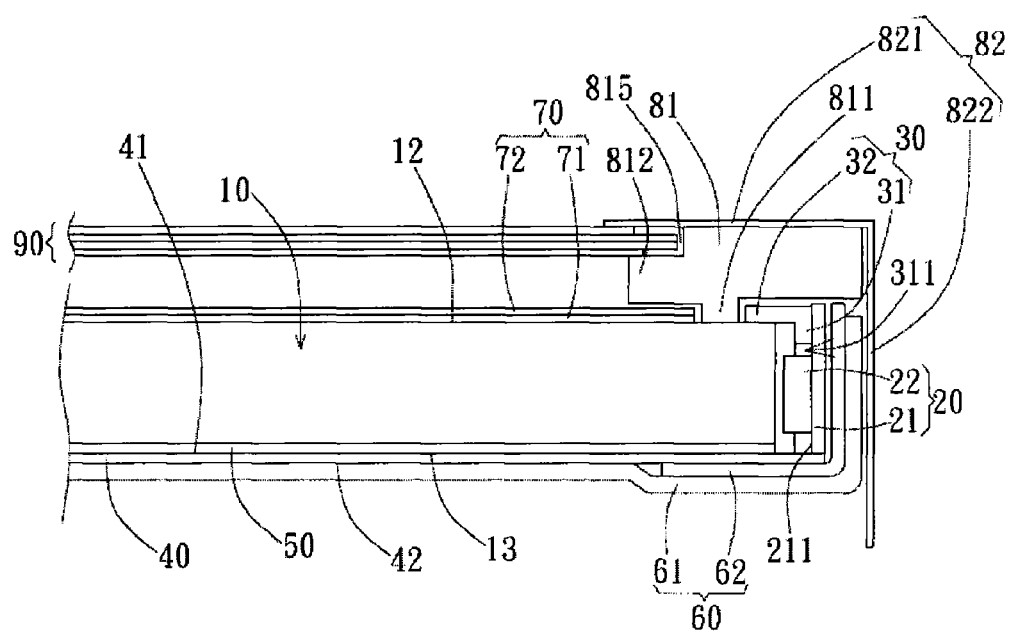
FIG. 4 is a schematic view of a second embodiment of the backlight structure of the present invention.

FIG. 4 is a schematic view of a second embodiment of the backlight structure of the present invention. As shown in FIG. 4, besides the light guide plate 10, the light source module 20, the reflective cover 30, the reflector 40, and the supporting structure 60, the backlight structure further includes an optical film 70 attached onto the light-exiting surface 12 of the light guide plate 10, a inner frame 81, a outer frame 82, and a panel unit 90. The optical film 70 is preferably attached onto the light guide plate 10 by means of adhesive materials. The light guide plate 10 is preferably an optical glass plate, wherein the material of the optical glass plate can be soda glass, silica glass, ultra clear glass, or other optical glass. The material of optical glass has advantage of good thermal conduction and high structure strength in comparison with acrylics or other plastic materials, so that the optical film 70 attached onto the light guide plate 10 made of optical glass materials is not susceptible to deformation such as warpage due to stress or heat. In other embodiments, however, the light guide plate 10 can be made from other materials if required. The optical film 70 can be optical films like brightness enhancement film (BEF) or diffuser film. In the embodiment, the optical film 70 includes a first optical film 71 and a second optical film 72 overlapped to each other. In other embodiments, however, a single optical film or multiple optical films overlapping to each other can be disposed as the optical film 70 if required. Besides, a multilayer complex film integrating functions of a plurality of optical films on a single film can be utilized as the optical film 70.

The inner frame 81 is disposed on the light-exiting surface 12 and has a first frame portion 811 and a second frame portion 812. The inner frame 81 is provided for fixing the reflective cover 30. The inner frame 81 is formed to have the first frame portion 811 formed toward the light-exiting surface 12, wherein the first frame portion 811 is preferably disposed between the optical film 70 and the second reflecting portion 32 and provided for fixing the light guide plate 10. The second frame portion 812 is disposed on the surface of the optical film 70 opposite to the light-exiting surface 12 and provided for fixing the optical film 70. A recession 815 is formed on one side of the second frame portion 812 and the panel unit 90 is disposed and supported on the recession 815. In practical applications, the panel unit 90 can be a flat LCD panel unit, but not limited thereto. The outer frame 82 has a horizontal portion 821 and a vertical portion 822 for fixing the components of the backlight structure, wherein the horizontal portion 821 extends horizontally along the inner frame 81 and covers the edge of the panel unit 90, and the vertical portion 822 extends vertically along the inner frame 81 and covers the back plate 61. In the embodiment, the material of the inner frame 81 is plastics, and the material of the outer frame 82 is metal.

Figure 5A:
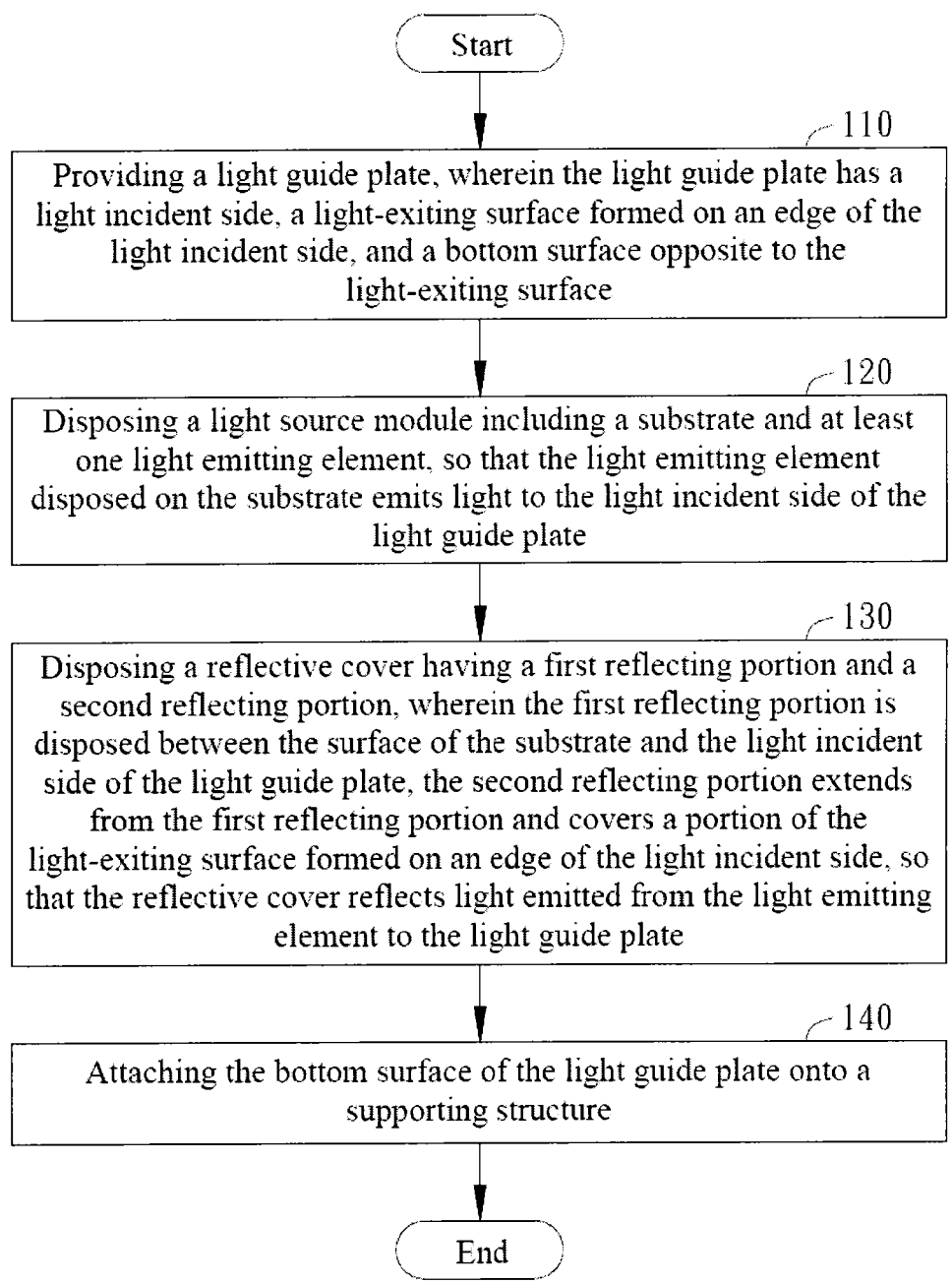
FIG. 5A is a flowchart of the first embodiment of the method for manufacturing the backlight structure of the present invention.

FIG. 5A is a flowchart of the first embodiment of the method for manufacturing the backlight structure of the present invention. As shown in FIG. 5A, a step 110 includes providing a light guide plate, wherein the light guide plate has a light incident side, a light-exiting surface formed on an edge of the light incident side, and a bottom surface opposite to the light-exiting surface. The light guide plate is preferably an optical glass plate, wherein the material of the optical glass plate is preferably soda glass, silica glass, ultra clear glass, or other optical glass. In the preferred embodiment, the step 110 further includes attaching a reflector onto the bottom surface of the light guide plate, so that the reflector reflects light emitted from a light emitting element to the light guide plate. The reflector is preferably attached onto the light guide plate by a glue layer (as shown in FIG. 1A), wherein the refractive index of the glue layer is preferably 1.0. In other embodiments, however, the reflector can be directly attached onto the light guide plate.

Figure 5B:
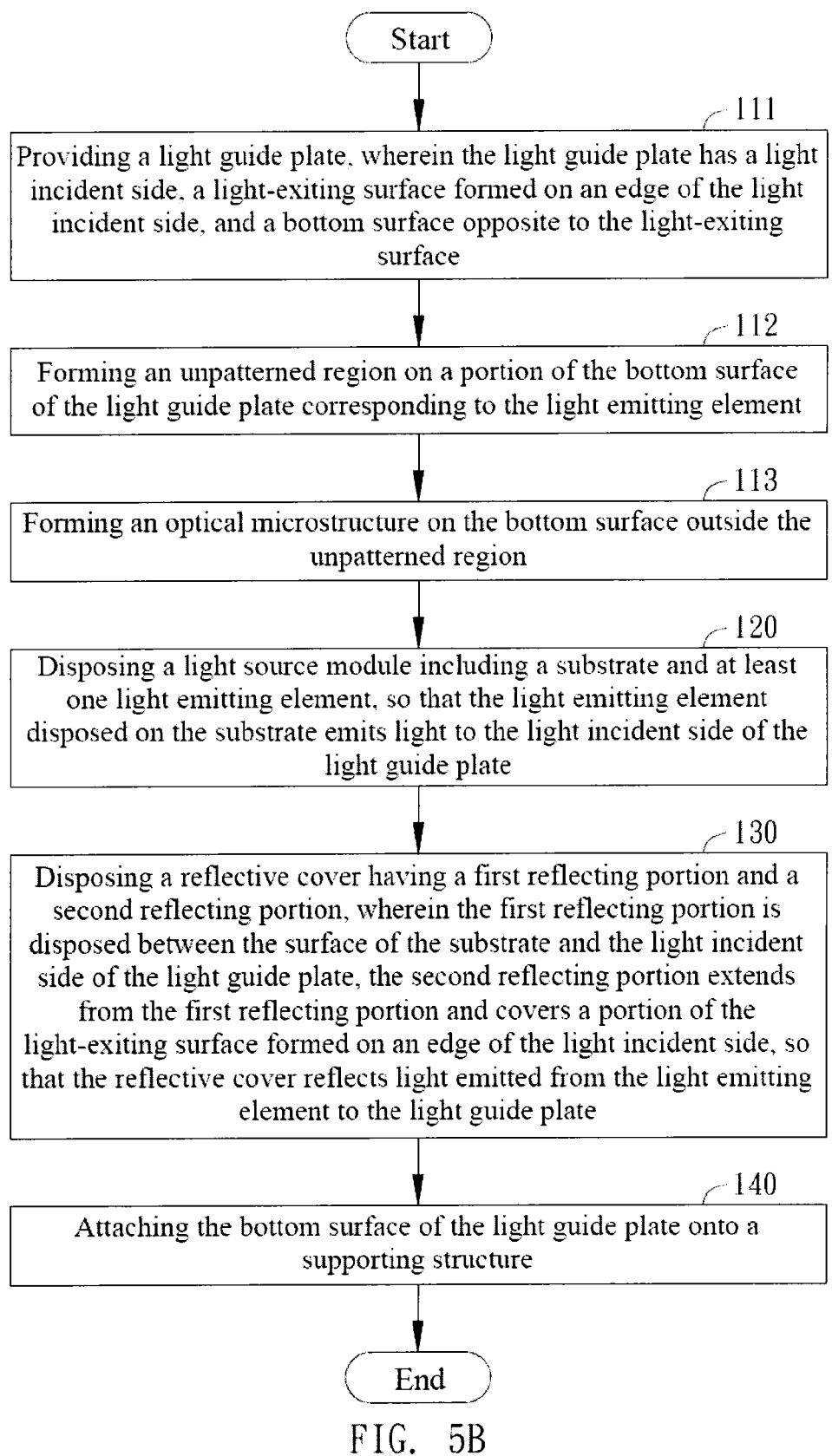
FIG. 5B is a flowchart of another embodiment of the step of providing the light guide plate in the method for manufacturing the backlight structure of FIG. 5A.

Step 120 includes disposing a light source module including a substrate and at least one light emitting element, so that the light emitting element disposed on the substrate emits light to the light incident side of the light guide plate. The light source module is preferably a light bar consisting of light-emitting diodes that serve as the light emitting element. In a preferred embodiment, a portion of the bottom surface of the light guide plate corresponding to the light emitting element is free of optical microstructure to avoid the formation of hot spot (shown in FIG. 3B) and further enhance the light utilization efficiency. As shown in FIG. 5B, the step 110 of providing the light guide plate shown in FIG. 5A further includes: step 111 of providing a light guide plate, wherein the light guide plate has a light incident side, a light-exiting surface formed on an edge of the light incident surface, and a bottom surface opposite to the light-exiting surface, step 112 of forming an unpatterned region on a portion of the bottom surface of the light guide plate corresponding to the light emitting element, and step 113 of forming an optical microstructure on the bottom surface outside the unpatterned region. The unpatterned region and the portion of the bottom surface having optical microstructures can be formed by a printing method. In other embodiments, however, the disposition of optical microstructure can be modified so that the entire bottom surface can be provided with or without optical microstructures. Besides, the unpatterned region or the optical microstructure can be formed by other methods if required.

Step 130 includes disposing a reflective cover having a first reflecting portion and a second reflecting portion, wherein the first reflecting portion is disposed between the surface of the substrate and the light incident side of the light guide plate, the second reflecting portion extends from the first reflecting portion and covers a portion of the light-exiting surface formed on an edge of the light incident side, so that the reflective cover reflects light emitted from the light emitting element to the light guide plate. In the embodiment, the material of the reflective cover is metal material, and the first reflecting portion is attached onto the surface of the substrate of the light source module (shown in FIG. 1A). In other embodiments, however, the material of the reflective cover can be plastic or other materials having similar function, and a space may exist between the first reflecting portion and the surface of the substrate of the light source module. Besides, in the embodiment, a recess is formed on the bottom side of the first reflecting portion to allow the light emitting element to pass therethrough (shown in FIG. 1B); in other embodiments, however, a through hole is formed on the middle part of the first reflecting portion to allow the light emitting element to pass therethrough (shown in FIG. 2).

Step 140 includes attaching the bottom surface of the light guide plate onto a supporting structure. Fixing the light guide plate on the supporting structure can enhance the strength of the whole structure. In the preferred embodiment, elements such as back plate can be utilized as the supporting structure. The light guide plate is attached onto the back plate by adhesive materials such as double-sided tape. In other embodiments, when the reflector is attached onto the bottom surface of the light guide plate, a first surface of the reflector can be attached onto the bottom surface of the light guide plate by a glue layer, and a second surface opposite to the first surface is preferably attached onto the back plate by adhesive material like double-sided tape (shown in FIG. 1A). By disposing the reflective cover and utilizing the structure of the reflective cover, the present invention improves the leakage of light between the light incident side of the light guide plate and the light source module, and therefore enhances the light utilization efficiency.

Figure 6:
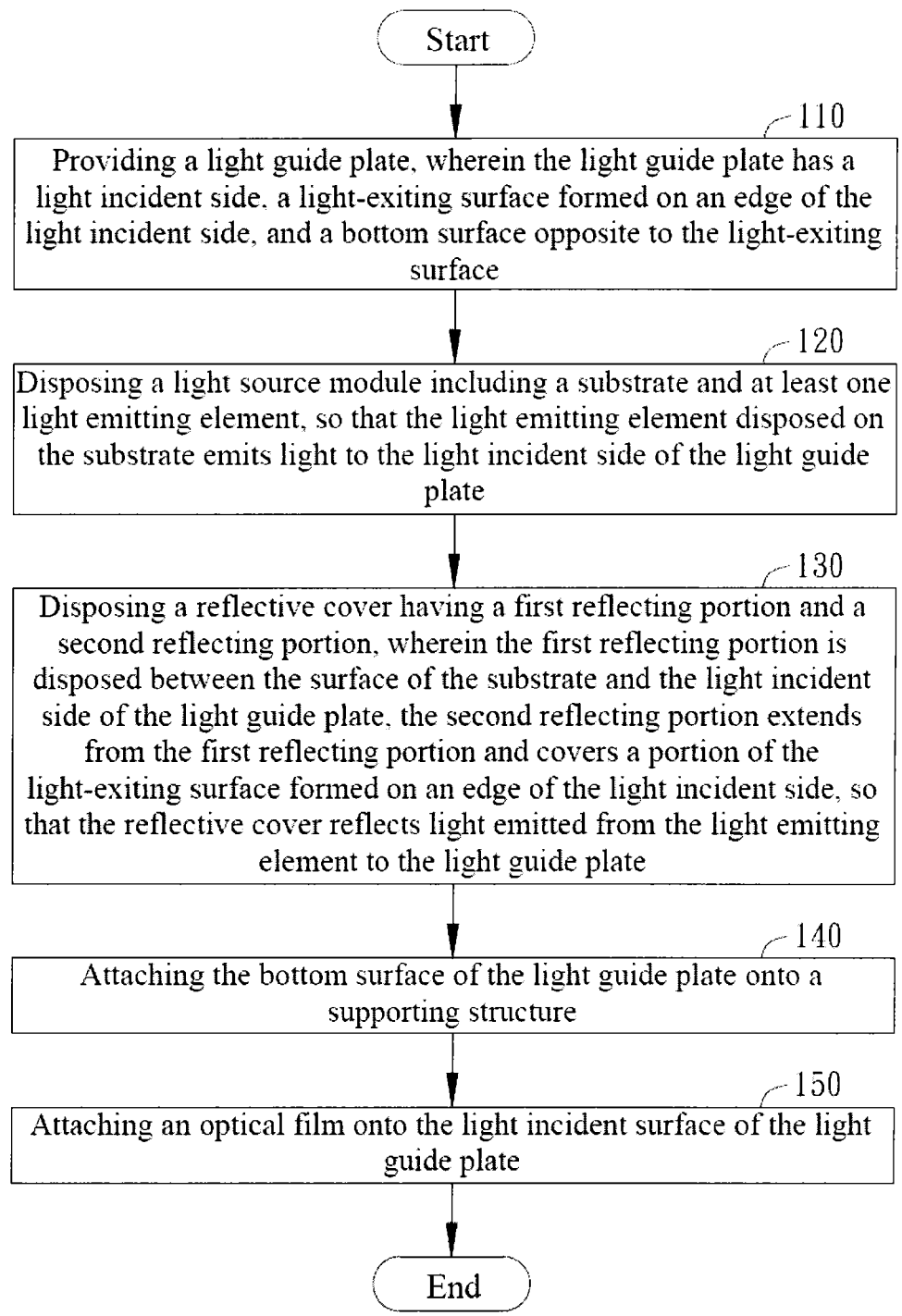
FIG. 6 is a flowchart of the second embodiment of the method for manufacturing the backlight structure of the present invention.

FIG. 6 is a flowchart of the second embodiment of the method for manufacturing the backlight structure of the present invention. As shown in FIG. 6, besides steps 110, 120, 130, and 140 of the above method for manufacturing the backlight structure, the method further includes a step 150 of attaching an optical film onto the light incident surface of the light guide plate. The optical film is preferably attached onto the light guide plate by adhesive material. The light guide plate is preferably an optical glass plate, wherein the material of the optical glass plate can be soda glass, silica glass, ultra clear glass, or other optical glass. In other embodiments, however, the light guide plate can be made from other materials if required. The optical film can be optical films such as brightness enhancement film or diffuser film. In other embodiments, a plurality of optical films can be overlapped with each other according to design requirements. A multi-layer complex film integrating functions of multiple optical films on a single film can also be utilized as the optical film.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A backlight structure, comprising:
    a light guide plate having a light incident side and a light-exiting surface formed on an edge of the light incident side; wherein the light guide plate further comprises a bottom surface opposite to the light-exiting surface;
    at least one light source module comprising a substrate and at least one light emitting element, wherein the substrate has a support surface facing the light incident side, the light emitting element is disposed on the support surface and emits light to the light incident side; a portion of the bottom surface proximate the light emitting element is an unpatterned region, and at least one optical microstructure is formed on the bottom surface outside the unpatterned region; and
    a reflective cover having a first reflecting portion and a second reflecting portion connected to each other, wherein the first reflecting portion is disposed between the light source module and the light incident side of the light guide plate, the second reflecting portion extends from the first reflecting portion toward the light guide plate, traverses a border between the light incident side and the light-exiting surface, and covers a part of the light-exiting surface, the first reflecting portion and the second reflecting portion reflect light emitted from the light emitting element to the light guide plate.

2. The backlight structure of claim 1, wherein the first reflecting portion is formed with a through hole to allow the light emitting element to pass therethrough.

3. The backlight structure of claim 1, wherein the first reflecting portion is formed with a recess on one side to allow the light emitting element to pass therethrough.

4. The backlight structure of claim 1, further comprising a back plate, wherein the light guide plate further comprises a bottom surface opposite to the light-exiting surface, and the bottom surface is attached onto the back plate.

5. The backlight structure of claim 1, wherein the light guide plate is an optical glass plate.

6. The backlight structure of claim 5, wherein the material of the optical glass plate is selected from soda glass, silica glass, and ultra clear glass.

7. The backlight structure of claim 5, further comprising at least one optical film attached onto the light-exiting surface of the light guide plate.

8. The backlight structure of claim 7, wherein the at least one optical film comprising multiple optical films overlapped with each other and attached onto the light-exiting surface of the light guide plate.

9. The backlight structure of claim 7, wherein the optical film is a multilayer complex film.

10. The backlight structure of claim 5, further comprising a reflector, wherein the light guide plate further comprises a bottom surface opposite to the light-exiting surface, and the reflector is attached onto the bottom surface and reflects light emitted from the light emitting element to the light guide plate.

11. The backlight structure of claim 10, further comprising a glue layer disposed between the reflector and the light guide plate, and the refractive index of the glue layer is substantially equal to 1.0.

12. The backlight structure of claim 10, further comprising a back plate, wherein the reflector has a first surface and a second surface opposite to the first surface, the first surface is attached onto the bottom surface of the light guide plate, and the second surface is attached onto the back plate.

13. A method for manufacturing a backlight structure, comprising:
providing a light guide plate comprising a light incident side, a light-exiting surface formed on an edge of the light incident side, and a bottom surface opposite to the light-exiting surface;
forming an unpatterned region on a portion of the bottom surface proximate the light emitting element, and forming at least one optical microstructure on the bottom surface outside the unpatterned region;
disposing at least one light source module comprising a substrate and at least one light emitting element, the substrate having a support surface, the light emitting element being disposed on the support surface, wherein the support surface faces the light incident side, so that the light emitting element emits light to the light incident side; and
disposing a reflective cover having a first reflecting portion and a second reflecting portion connected to each other, wherein the first reflecting portion is disposed between the light source module and the light incident side of the light guide plate, the second reflecting portion extends from the first reflecting portion toward the light guide plate, traverses a border between the light incident side and the light-exiting surface, and covers a part of the light-exiting surface, the first reflecting portion and the second reflecting portion reflect light emitted from the light emitting element to the light guide plate.

14. The method for manufacturing a backlight structure of claim 13, further comprising forming a through hole on the first reflecting portion to allow the light emitting element to pass therethrough.

15. The method for manufacturing a backlight structure of claim 13, further comprising forming a recess on one side of the second reflecting portion to allow the light emitting element to pass therethrough.

16. The method for manufacturing a backlight structure of claim 13, wherein the light guide plate further comprises a bottom surface opposite to the light-exiting surface, and the method further comprises attaching the bottom surface onto a back plate.

17. The method for manufacturing a backlight structure of claim 13, wherein the light guide plate is an optical glass plate.

18. The method for manufacturing a backlight structure of claim 17, wherein the material of the optical glass plate is selected from soda glass, silica glass, and ultra clear glass.

19. The method for manufacturing a backlight structure of claim 17, further comprising disposing at least one optical film, so that the optical film is attached onto the light-exiting surface of the light guide plate.

20. The method for manufacturing a backlight structure of claim 19, comprising overlapping multiple optical films with each other, so that the optical films are attached onto the light-exiting surface of the light guide plate.

21. The method for manufacturing a backlight structure of claim 19, wherein the optical film is a multilayer complex film.

22. The method for manufacturing a backlight structure of claim 17, wherein the light guide plate further comprises a bottom surface opposite to the light-exiting surface, the method further comprises disposing a reflector, so that the reflector is attached onto the bottom surface of the light guide plate and reflects light emitted from the light emitting element to the light guide plate.

23. The method for manufacturing a backlight structure of claim 22, further comprising disposing a glue layer between the reflector and the light guide plate, wherein the refractive index of the glue layer is substantially equal to 1.0.

24. The method for manufacturing a backlight structure of claim 22, wherein the reflector has a first surface and a second surface opposite to the first surface, the first surface is attached onto the bottom surface of the light guide plate, and the method further comprises attaching the second surface onto a back plate.

* * * * *